Patented Dec. 2, 1930  1,783,725

UNITED STATES PATENT OFFICE

HELLMUTH LANGHEINRICH, OF NEUROESSEN, GERMANY, ASSIGNOR TO I. G. FARBEN-INDUSTRIE AKTIENGESELLSCHAFT, OF FRANKFORT-ON-THE-MAIN, GERMANY, A CORPORATION OF GERMANY

RECOVERY OF SULPHUR FROM ALKALI-METAL POLYSULPHIDES

No Drawing. Application filed August 5, 1929, Serial No. 383,790, and in Germany August 23, 1928.

The present invention relates to the recovery of sulphur from solutions of alkali metal polysulphides.

Processes for the recovery of sulphur from solutions of ammonium polysulphides are already known according to which the solutions are heated, whereby the ammonium polysulphide decomposes into ammonium sulphide and sulphur, and the ammonium sulphide is then distilled off. These processes require a considerable expenditure of heat since besides the ammonium sulphide a part of the water is distilled off, and the recovery of the heat employed is only possible by the employment of special auxiliary apparatus.

I have now found that sulphur is recovered from solutions of alkali metal polysulphides, which term is used in a broad sense, including ammonium polysulphides, in a very economical manner without the objection above referred to, by heating the solutions at temperatures between 150° C. and the critical temperature of water, that is 374° C. in a closed vessel, that is under their own vapor pressure. According to this manner of working a separation of the sulphur is effected to a large extent. At temperatures of from 300° to 350° C., for example, the vapor pressure of the solutions of alkali metal polysulphides amounts to between about 150 and 220 atmospheres.

The sulphur which separates out, collects in the liquid state at the bottom of the pressure tight vessel from which it can be drawn off. The supernatant solution contains the entire quantity of alkali metal sulphide formed by the decomposition, except for a small quantity of hydrogen sulphide, and in the case of ammonium polysulphide a small quantity of ammonia, formed by hydrolysis.

The process may be rendered continuous by introducing the solution of polysulphides to be decomposed into the pressure tight vessel at the same rate as the decomposed solution and the separated sulphur are allowed to leave the vessel.

The effluent solution, taking into account the decrease in volume by reason of the separation of sulphur, has the same concentration of alkali metal sulphite as the initial solution.

The process in accordance with the present invention has, in particular when working continuously, the advantage of a small consumption of heat, since no evaporation occurs and the heat employed can readily be recovered by the exchange of heat between the entering and the effluent solutions.

The heat content of the sulphur drawn off can be utilized in a subsequent distillation of the sulphur and thus a further economy can be effected.

The following examples will further illustrate the nature of the said invention but the invention is not restricted to these examples.

Example 1

4.2 liters of a solution of ammonium polysulphides containing per liter 79.4 grams of ammonia and 257.5 grams of sulphur, of which latter 65.5 grams are in the form of monosulphide, are heated at about 330° C. in an autoclave resistant to high pressure of a capacity of about 7.5 liters. The total pressure in the autoclave amounts to about 220 atmospheres. The volume of the solution increases by heating to about 6.5 liters so that a free space of about 1 liter remains. By allowing polysulphide solution to run in continuously at the rate of 4 liters per hour and allowing the separated sulphur and the solution deprived of part of its sulphur to run out at a corresponding rate, the effluent sulphide solution contains, per liter, about 78 grams of ammonia and 101 grams of sulphur, of which 66 grams are in the form of mono-sulphide. Thus about 82 per cent of the sulphur which was not combined as monosulphide is separated.

Example 2

The decomposition of a solution of potassium poly-sulphide containing, per liter, 152.8 grams of potassium and 264.5 grams of sulphur, of which latter 62.5 grams are in the form of mono-sulphide, is carried out at 325° C. (vapor pressure 160 atmospheres) in the manner described in Example 1. The effluent solution contains, per liter, about 150 grams of potassium and 173 grams of sulphur, of which 62 grams are in the form of mono-sulphide. The precipitate of sulphur thus amounts to 45 per cent of the sulphur which was not combined as mono-sulphide.

What I claim is:—

1. The process for the recovery of sulphur from solutions of alkali metal polysulphides which comprises heating such solution to between 150° and 374° C. under its own vapor pressure.

2. The process for the recovery of sulphur from solutions of ammonium polysulphides which comprises heating such solution to between 150° and 374° C. under its own vapor pressure.

3. The process for the recovery of sulphur from solutions of ammonium polysulphides which comprises heating such solution to about 330° C. under its own vapor pressure.

In testimony whereof I have hereunto set my hand.

HELLMUTH LANGHEINRICH.